May 12, 1931. E. G. E. VIVES 1,804,965
HEAD LAMP FOR MOTOR VEHICLES
Filed Nov. 22, 1927 2 Sheets-Sheet 1

INVENTOR:
E. G. E. Vives, deceased, by
S. J. Cazautet, administratrix by: Marks & Clerk Attys.

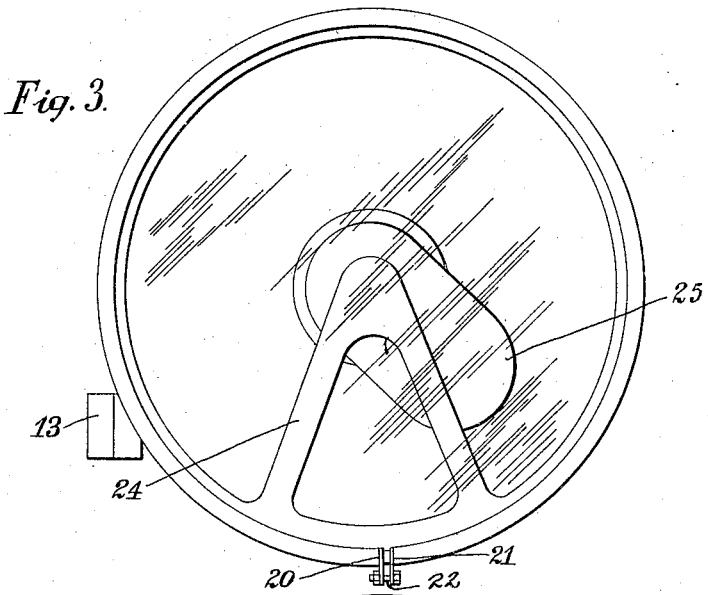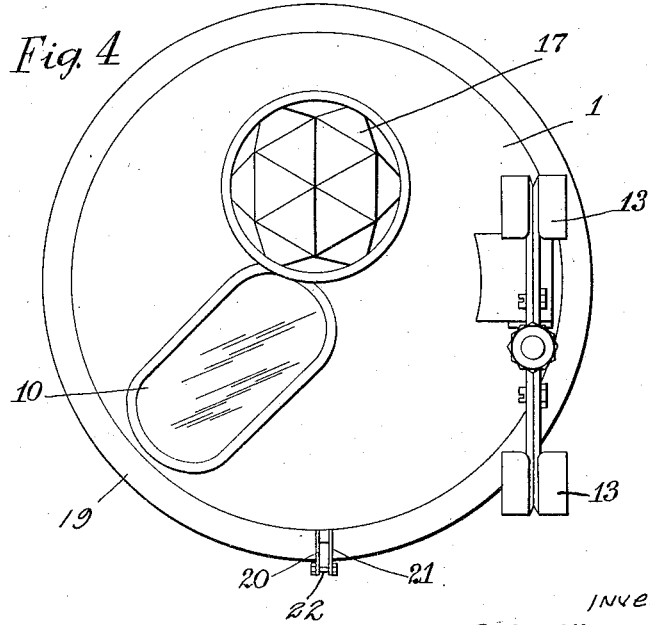

Patented May 12, 1931

1,804,965

UNITED STATES PATENT OFFICE

EMILE GUSTAVE EDOUARD VIVES, DECEASED, LATE OF ST. PE, FRANCE, BY SUZANNE JEANNE CAZAUTET (WIDOW VIVES), ADMINISTRATRIX, OF ST. PE, FRANCE

HEAD LAMP FOR MOTOR VEHICLES

Application filed November 22, 1927, Serial No. 235,097, and in France November 24, 1926.

The present invention relates to an auxiliary headlight for motor cars projecting with a single light source two distinct light bundles, one in front and the other sideways and backwardly for lighting the road on the side of the car so as to facilitate the passing of cars at night.

In this auxiliary headlight, in the same casing and in addition to the main reflector, two additional reflectors are combined with the single source of light, these two reflectors being preferably united in one piece, one of the reflectors serving for the front light bundle and the other for the back and lateral light bundle.

The accompanying drawings illustrate, by way of example only, the said auxiliary headlight.

Fig. 3 is a front view of the auxiliary headlight.

Fig. 4 is a back view of the same.

Figure 1:
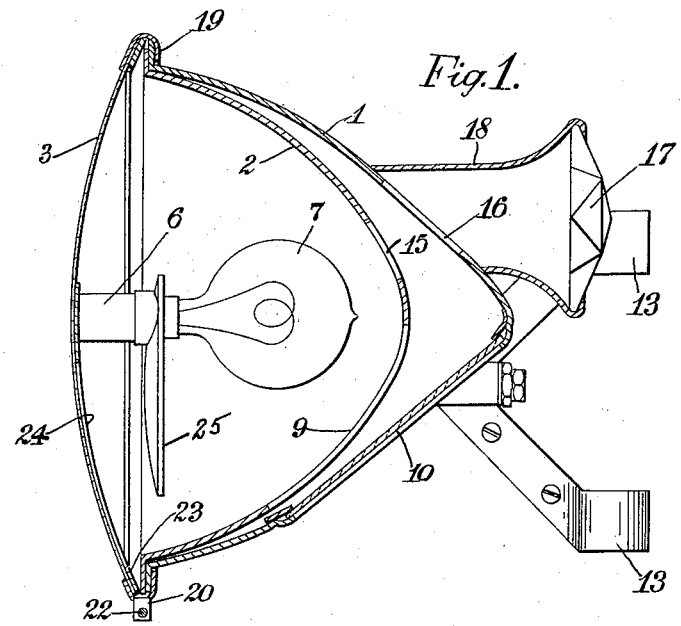
Fig. 1 is a sectional elevation of the auxiliary headlight.

As illustrated in the drawings, this auxiliary headlight is composed of a casing 1, with a parabolic reflector 2; an aperture 9—10 is provided as well in the reflector as in the casing for the passage of a back and side light bundle; the aperture in the casing will be closed by a glass plate; the shape of this aperture is variable, it preferably extends to axis of the auxiliary headlight. Moreover, the bottom of the reflector 2 will be provided with a small opening 15 and the casing with a corresponding opening 16 for the passage towards the back of light rays, in order to light a red glass arranged at 17 at the end of a kind of chamber 18 secured on the casing 1 and surrounding the opening 16.

This red light can be dispensed with and replaced by a mirror allowing to see backwardly.

The glass plate 3 is mounted on the headlight in the following manner; the edges of the front opening of the casing as well as those of the reflector 2 are bent outwardly at right angles, so as to form a flange; the glass plate fits on this flange and is held in position by means of a ring 19 of U or V-shaped cross section; this ring is cut away at a point of its circumference, so as to allow to place it in position by spacing apart its two ends 20—21. Any locking member 22 then connects the two ends of the said ring and the glass plate is thus firmly held in position; this ring might be made in two parts jointed together for facilitating the opening of the same.

Figure 2:
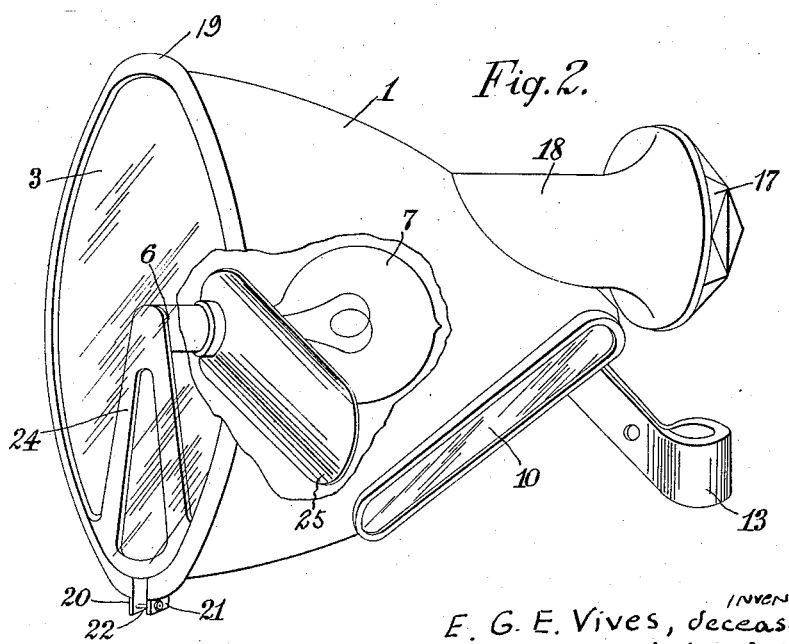
Fig. 2 is a perspective view of the same, a portion being broken away in order to show the additional reflectors.

The said ring has another function: it cooperates for securing a special member on which is mounted the lamp. This member is constituted by a metal crown 23 of small width, provided with a triangular tongue 24 preferably cut out as shown in Figs. 2 and 3, this tongue extending from the periphery of the crown to a slight distance beyond its center; the crown and its tongue can be obtained by cutting them out from one and the same metal disc; the whole can present a plane or bulged surface, according as the glass plate 3 is plane or convex, so that the tongue 24 fits against the glass plate; it is to be understood that the tongue 24 alone might have a bulged or concaved shape.

The crown 23 is of such a small width that when it is fitted in position it is not apparent.

On the said tongue 24 is secured the socket 6 carrying the lamp 7 directed towards the bottom of the reflector 2 and placed at its focus.

On this socket or at the rear of the latter is mounted the reflector 25 which is of elongated and concave shape; the portion of this reflector which is directly at the rear of the lamp sends the light rays backward upon the reflector 2, whilst the other portion sends the light rays through the apertures 9—10 for constituting the rear and side light bundle.

The shape of the aperture 10 is preferably combined with the shape of the reflector 25, so that the aperture is masked by the reflector 25 and that all the light rays reflected by the reflector pass through the aperture.

The said headlight is provided with a securing device 13 allowing to secure it at any suitable place and particularly to the left-hand post of the windshield; in the countries where the traffic follows the left-hand side of the roads, the headlight will be of course placed on the right-hand side of the car.

The operation for passing cars is the following:

When passing a car, the headlights will be extinguished and the small electric bulb they contain lighted. For avoiding the dazzling effect, by lack of light subsequent to this operation, the headlight or projector forming the subject matter of this invention will be lighted by means of any switch arranged on dash-board or on the steering hand wheel, and thus the portion of the road at the front and the right hand side will be lighted by the main light bundle, this allowing to continue travelling forward without dazzling the driver by lack of light, but also without dazzling the driver of the passing car.

The side and rear bundle is emitted through the aperture 10 for the purpose of facilitating the passing for the advance driver who is dazzled (the headlights being extinguished) by:

1st. Lighting the passing zone by illuminating the obstacles which may happen to be there or which may spring up in this dangerous zone obstacles which will thus be visible on the rear light sheet created by the projector;

2nd. Indicating the size and location of the passing car;

3rd. Very clearly indicating to the driver of the passing car, the space remaining free for the passage of this car.

In the case of backward running at night, it is obvious that the present projector will highly facilitate the task of driver; even in case the headlights and rear red light will not operate, this projector can act as an emergency lighting device.

The projector forming the subject-matter of the present invention can be combined with the already known systems of diffusing glasses, shades lowering the light rays towards the ground, plug for portable lamp, mirrors for allowing to see backwardly.

The single lamp might obviously be mounted in another manner; for instance, it might be secured in the bottom of the reflector, or it might be mounted vertically, horizontally, etc.

The forms, details, dimensions, as well as the materials used can of course be varied without departing thereby from the principle of the invention.

What is claimed is:

1. An automobile auxiliary headlight comprising in combination a casing having light transmitting apertures for both forward and combined rear and side beams of light, a main reflector, a single source of light located at the focus of the main reflector, supplementary reflecting means for intensifying both beams of light constructed as a single member and mounted within the main reflector between the front light transmitting aperture and the source of light, and a common support for both the supplementary reflecting means and the source of light detachably associated with the main reflector.

2. An automobile auxiliary headlight comprising in combination a casing having glazed light transmitting apertures for both forward and combined rear and side beams of light, a main reflector, a single source of light located at the focus of the main reflector, supplementary reflecting means for intensifying both beams of light constructed as a single member and mounted between the front glass of the casing and the source of light upon a member supporting the latter, the said supporting member being carried by a tongue which is shaped to lie flush against the front glass and is rigid with a crown adapted to be interposed between a flanged edge of the casing and the said front glass, and an interrupted ring provided with a locking member for clamping the crown and front glass in position.

In testimony whereof I have signed my name to this specification.

SUZANNE CAZAUTET, Widow Vives,
*Administratrix of the Estate of Emile Gustave Edouard Vives, Deceased.*